US008817317B2

(12) United States Patent
Rufes et al.

(10) Patent No.: US 8,817,317 B2
(45) Date of Patent: Aug. 26, 2014

(54) METHOD AND SYSTEM FOR TWO SIDED PRINTING

(75) Inventors: Ezequiel Jordi Rufes, Sant Feliu de Llobregat (ES); Laura Sanchez, Barcelona (ES); Carles Flotats, Barcelona (ES); Marcos Casaldaliga, Sant Cugat del Valles (ES)

(73) Assignee: Hewlett-Packard Development Company, L.P., Houston, TX (US)

(*) Notice: Subject to any disclaimer, the term of this patent is extended or adjusted under 35 U.S.C. 154(b) by 849 days.

(21) Appl. No.: 12/898,667

(22) Filed: Oct. 5, 2010

(65) Prior Publication Data

US 2012/0081753 A1 Apr. 5, 2012

(51) Int. Cl.
*B41F 1/54* (2006.01)
*G06K 15/00* (2006.01)

(52) U.S. Cl.
USPC ............ 358/1.18; 358/1.9; 358/1.12; 347/16; 347/40; 347/107; 399/75; 399/395

(58) Field of Classification Search
USPC .................. 358/1.18, 1.12, 1.9; 399/75, 395; 347/16, 107
See application file for complete search history.

(56) References Cited

U.S. PATENT DOCUMENTS 5,434,956 A 7/1995 Son et al.
5,567,329 A * 10/1996 Rose et al. ..................... 216/18
5,725,211 A 3/1998 Blanchard et al.
6,226,419 B1 * 5/2001 Lodwick et al. .............. 382/294
6,505,906 B1 * 1/2003 Bland et al. ..................... 347/16
6,806,896 B2 10/2004 Conrow et al.
6,813,451 B2 11/2004 Wibbels
6,836,627 B2 12/2004 Kretschmann et al.
6,988,725 B2 1/2006 Rapkin
6,991,387 B2 1/2006 Kida
7,277,669 B2 * 10/2007 Howe ............................ 399/395
7,552,995 B2 * 6/2009 Nakazawa et al. .............. 347/40
7,593,656 B2 9/2009 Boness et al.
7,630,653 B2 12/2009 Bonino
2003/0126962 A1 * 7/2003 Bland et al. ....................... 83/13
2005/0286922 A1 * 12/2005 Oki ................................ 399/75
2006/0159480 A1 * 7/2006 Mima et al. ..................... 399/82
2007/0175351 A1 * 8/2007 Boness ......................... 101/485
2009/0244561 A1 10/2009 Mongeon et al.
2010/0047000 A1 2/2010 Park et al.
2010/0225932 A1 * 9/2010 Kurose et al. .................. 358/1.1

OTHER PUBLICATIONS

Sabuncu, Mert R., et al.; "Using Spanning Graphs for Efficient Image Registration": May 2008: vol. 17: pp. 788-797.

* cited by examiner

*Primary Examiner* — Allen H Nguyen

(57) ABSTRACT

In one embodiment, printing, on a first side of a media, of a first plurality of plots and a plurality of associated fiducials is caused. For each of a second plurality of plots, using data from a sensor, a distance to one of the plurality of associated fiducials is measured to discern a reference for printing that plot on a second side of the media. Printing of the second plurality of plots on the second side is caused so that each of the second plurality of plots is substantially in registration with one of the first plurality of plots.

15 Claims, 7 Drawing Sheets

METHOD AND SYSTEM FOR TWO SIDED PRINTING

BACKGROUND

In certain printing environments, it is desired to print a first series of images upon a first side of a media, and a second series of images on a second side of the media such that the first series of images is in registration with the second set of images. For example, when printing a two sided banner at a large format printer, the print job may include printing a first series of plots on the front side of the banner, and a second series of plots on the back side of the banner, with the goal that the plots on the front and back sides are precisely aligned.

BRIEF DESCRIPTION OF THE DRAWINGS

The accompanying drawings illustrate various embodiments and are a part of the specification. The illustrated embodiments are merely examples and do not limit the scope of the claims. Throughout the drawings, identical reference numbers designate similar, but not necessarily identical elements.

The same part numbers designate the same or similar parts throughout the figures.

DETAILED DESCRIPTION OF EMBODIMENTS

Positioning of plots may be calculated during processing of the plots for two-sided printing, but the calculated positioning can be affected by a number of factors that cause errors during printing. For example, high temperatures within the printer during printing or curing processes can cause the media to deform, in turn causing the calculated plot positions to be out of registration. In another example, media skew attributable to a media loading error can cause the calculated plot positions to be out of registration.

As used in this specification and the appended claims, a printed second plot is referred to as being "in registration" with a printed first plot if the printed first and second plots are properly aligned, placed and/or oriented relative to each other. In an example, the first plot is a first side of a banner to be printed on a first side of a media, and the second plot is a second side of the banner to be printed on a second side of the media. If the first and second plots are not printed substantially in registration, the finished banner may be perceived as being of poor quality and unacceptable to a user. Registration errors can be particularly noticeable when printing on two sides of transparent or semi-transparent media. Errors in registration can be costly as miscalculation can result in a substandard printed product, wasted media, wasted consumables (e.g. ink or toner), wasted machine time and/or wasted user time. Various embodiments of the present disclosure were developed in an effort to provide a method and a system for two sided printing that improves registration of first and second side images, leading to reductions in waste, better ease of use, and a better customer experience.

The following description is broken into sections. The first, labeled "Environment", describes an example environment in which embodiments may be implemented. The second section, labeled "Components", describes various physical and logical components utilized to implement various embodiments. The third section, labeled as "Operation", describes steps taken to implement various embodiments. The fourth section, labeled "Example", describes an example implementation of the disclosed method and system for two sided printing.

Figure 1:
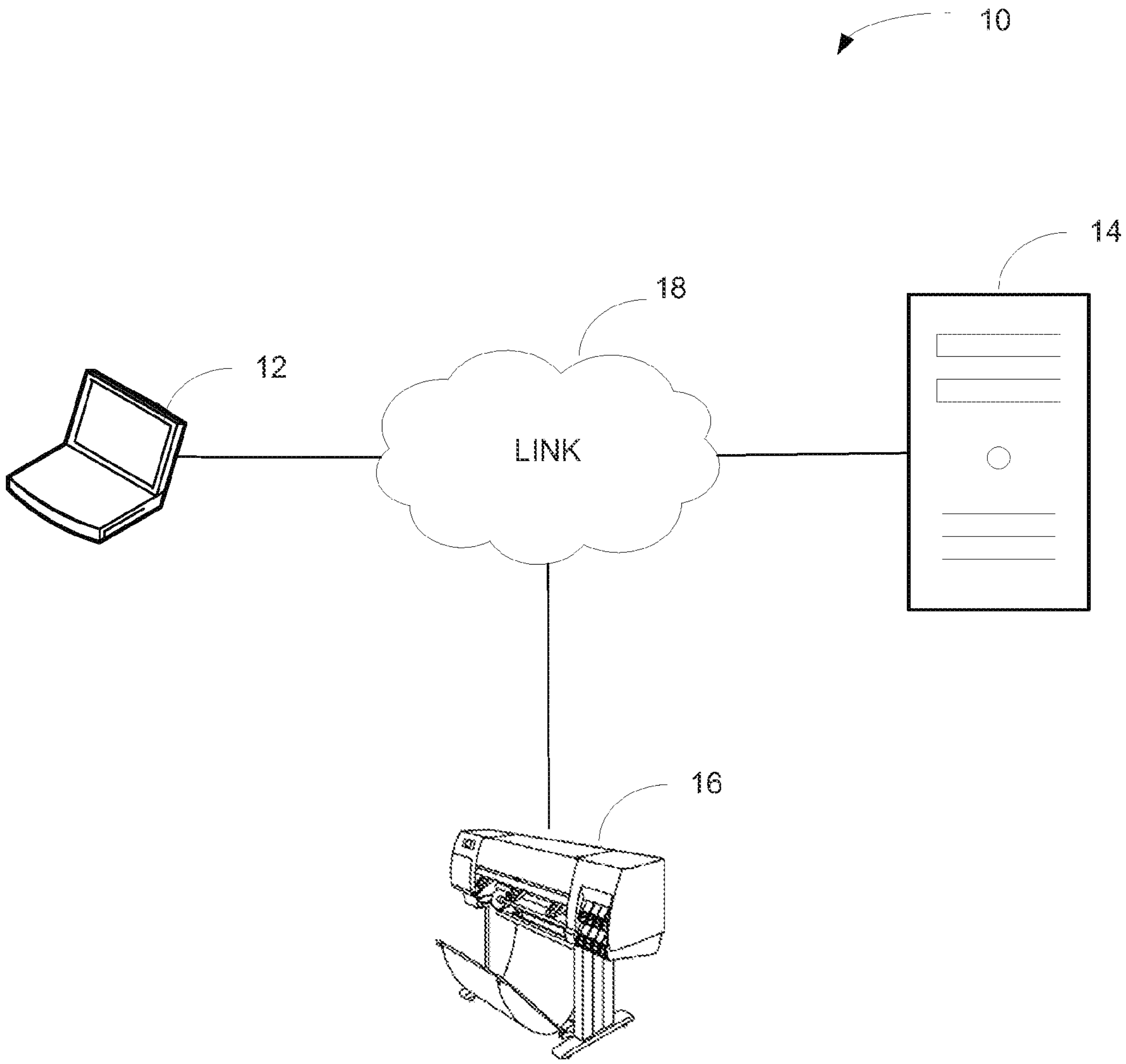
FIG. 1 depicts an example environment in which various embodiments may be implemented.

ENVIRONMENT: FIG. 1 depicts an example environment 10 in which various embodiments may be implemented. Environment 10 is shown to include computing device 12 and server 14 interconnected via link 18. Computing device 12 represents generally any computing device capable of sending network requests to and otherwise communicating with server 14 and/or printer 16. Examples include a desktop computer, laptop computer, digital tablet computer, and the like.

Server 14 represents generally any computing device, or multiple computing devices, capable of receiving and responding to network requests from computing device 12 and/or printer 16 via link 18. As discussed with reference to FIG. 3 below, server 14 may be a server operable to receive a print fulfillment request and/or content from a client 12 and in response cause a printer 16 to produce printed output. Server 14 may be additionally operable to run a raster image processing application and process plots for two sided printing at printer 16.

Printer 16 represents generally any device operable to receive and process responses to requests to print content from client 12 and/or server 14, and to produce printed output.

Computing device 12, server 14 and printer 16 are interconnected via link 18. Link 18 represents generally one or more of a cable, wireless, fiber optic, or remote connection via a telecommunication link, an infrared link, a radio frequency link, or any other connectors or systems that provide electronic communication. Link 18 may include, at least in part, an intranet, the internet, or a combination of both. Link 18 may also include intermediate proxies, routers, switches, load balancers, and the like. The paths followed by link 18 between computing devices 12 and server 14 as depicted in FIG. 1 represent the logical communication paths between these devices, not necessarily the physical paths between the devices.

Figure 2:
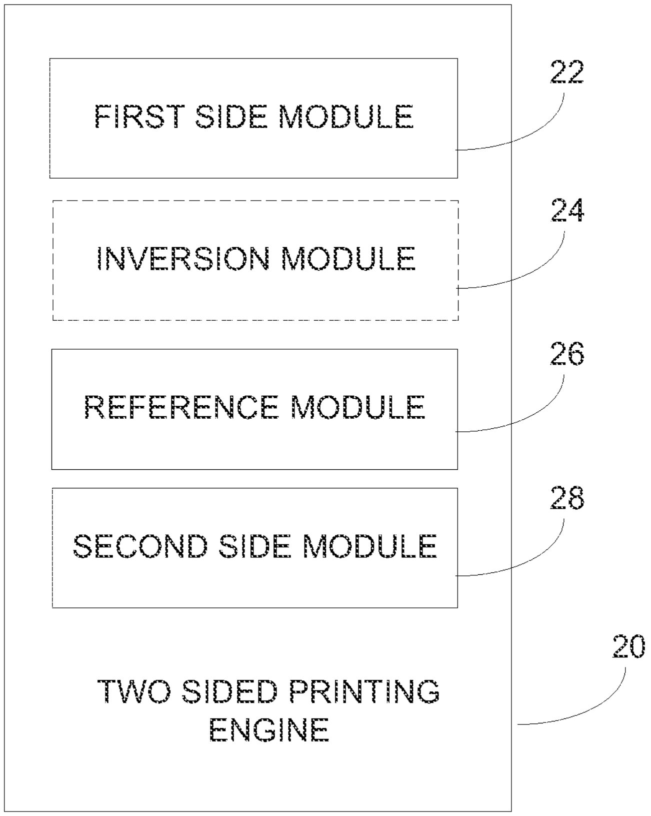
FIG. 2 depicts an example two sided printing engine according to an embodiment.

COMPONENTS: FIG. 2 depicts an example of a two sided printing engine 20. Two sided printing engine 20 represents generally any combination of hardware and programming configured for use to cause printing of a first plurality of plots on a first side of a media substantially in registration with a second plurality of plots on a second side of the media. In the example of FIG. 2, two sided printing engine 20 is shown to include a first side module 22, an inversion module 24, a reference module 26, and a second side module 28.

As used in this specification and the appended claims, a "plot" means a representation of an image (e.g. an object, scene, person, or abstraction) converted to programming language and/or numerical form so that it can be stored and used in computing devices, servers, printers and other machines capable of performing calculations and manipulating data. The plot may include instructions as to how the image is to be printed. In embodiments, a plot may be expressed in a number of various languages and formats, including but not limited to HPGL/2 (Hewlett-Packard Graphics Language 2), PostScript, PDF (Portable Document Format), JPEG (Joint Photographic Experts Group standard), TIFF (Tagged Image File Format) and PCL3 (Printer Command Language 3). When a plot is printed on a media, a visual representation of the plot is created on the media. As used in this specification and the appended claims, a "fiducial" means a rectangle, line segment, dot, spot, cross, or other geometrical shape or other visual feature that may be placed in the focal plane of a sensor and used as a reference point for measuring.

First side module 22 represents generally any combination of hardware and programming configured to cause printing, on a first side of a media, of a first plurality of plots and a plurality of associated fiducials. In an embodiment, each of the plurality of associated fiducials is printed on the first side following printing of a first plot from the first plurality of plots. As discussed in more detail below, each of the associated fiducials is used in discerning or determining a reference for printing one of a second plurality of plots on the second side of the media.

In an embodiment, each of the plurality of associated fiducials is a line or rectangle printed at a known, consistent distance following the plot with which that fiducial is associated. As used in this specification and the appended claims, the "width" of a fiducial or a plot denotes the dimension across the fiducial or plot in a direction perpendicular to the long axis of the print media. Thus, the term "width" is used relative to the positioning of the fiducial or plot on the print media, and does not suggest that the fiducial or plot has another dimension that exceeds the "width". In an embodiment the fiducials are printed at least approximately perpendicular to the long axis of a media roll. In other embodiments, the fiducials may have different shapes, coloration, widths, and/or lengths.

Inversion module 24 represents generally any combination of hardware and programming configured to cause inversion of the media after printing of the first plurality of plots to cause the second side to be in a position to be printed upon, and the associated fiducials to be exposed to a sensor as the media is advanced for second side printing. In an example, inverting the media may comprise causing the media to be taken up on a take-up device, e.g. a reel, during printing of the first plurality of plots, and causing positioning of the take-up device to supply the media during printing of the second plurality of plots. In some embodiments, inversion of the media may not be required for printing of the second side and inversion module 24 may not be included. For example, if a printer is configured with printheads positioned on opposite sides of a media path so as to enable printing on two sides of media in a single pass, inversion module 24 may not be needed to accomplish a second side printing.

Reference module 26 represents generally any combination of hardware and programming configured to measure, for each of a second plurality of plots, a distance to one of the plurality of associated fiducials to discern or determine a reference for printing that plot on a second side of the media. In an example, a first of the plurality of associated fiducials is printed on the first side following printing of a first plot from the first plurality of plots, the first fiducial to provide the reference for printing of a second plot, the second plot included within the second plurality of plots. The measurements are made using data from a sensor.

In an embodiment, the measurements are made utilizing data from a sensor that is contained within a printer housing. The sensor is configured to measure distances to a fiducial printed on a first side of a media as the media is transported through a print zone for second side printing. In another embodiment, the measurements are made utilizing data from a sensor situated adjacent, but external to, the printer (e.g. a sensing device that is mounted external to the printer housing and has the printer paper path within its focal plane) as the media is positioned or transported for printing on the second side. In embodiments, the sensor may be any distance-measuring sensor, such as an optical sensor, an acoustic sensor, a laser sensor or an LED sensor. In an embodiment, an optical sensor system may include a light-emitting diode (LED), or an array of LEDs, to provide adjustable and uniform illumination to the media in order to discern the fiducials. In an embodiment, the sensor is an optical sensor that captures a digital image of the fiducial, or of a physical characteristic or other reference point on the fiducial on the first side of the media while aligning the media for second side printing.

In an embodiment, references are discerned or determined via the reference module 26 performing calculations involving measured distance data, utilizing a processor and a memory. In another embodiment, references are discerned or determined utilizing measurements from the sensor, via the reference module 26 receiving or obtaining a value from a pre-existing lookup table that is stored in a memory.

Second side module 28 represents generally any combination of hardware and programming configured to cause printing of the second plurality of plots on the second side so that each of the second plurality of plots is substantially in registration with one of the first plurality of plots. In an embodiment, the second side module 28 receives a signal from the reference module 26 when a fiducial, the fiducial printed on the first side of the media and associated with a first plot printed on the first side, has advanced in a media path to a predetermined distance from a sensor. The signal may indicate to the second side module 28 that the media is in an optimal position in relationship to a printhead or other printing element for printing of the second plot on the second side, in registration with the first plot on the first side. In an embodiment, a printer begins printing the second plot on the second side upon receipt of the signal.

In an embodiment, the fiducials and the first and second plots may be processed for printing by a common processor. In an embodiment, the fiducials and the first and second plots are processed by a raster image application that resides on a server external to the printer. In another embodiment, the fiducials and the first and second plots are processed by a raster image application that is firmware residing on a printer. In an embodiment, processing of the second plurality of plots for printing comprises rotating at least approximately 180 degrees, at least approximately mirroring, and reordering from last to first, the plots included within the first plurality of plots.

In an embodiment, the fiducials are processed utilizing a first processor that is separate from a second processor that is used to process the first and second pluralities of plots. For example, the fiducials may be processed at a printer, and the first and second pluralities of plots may be processed utilizing a raster image processing application that runs on a server or other computing device that is external to the printer.

Figure 3:
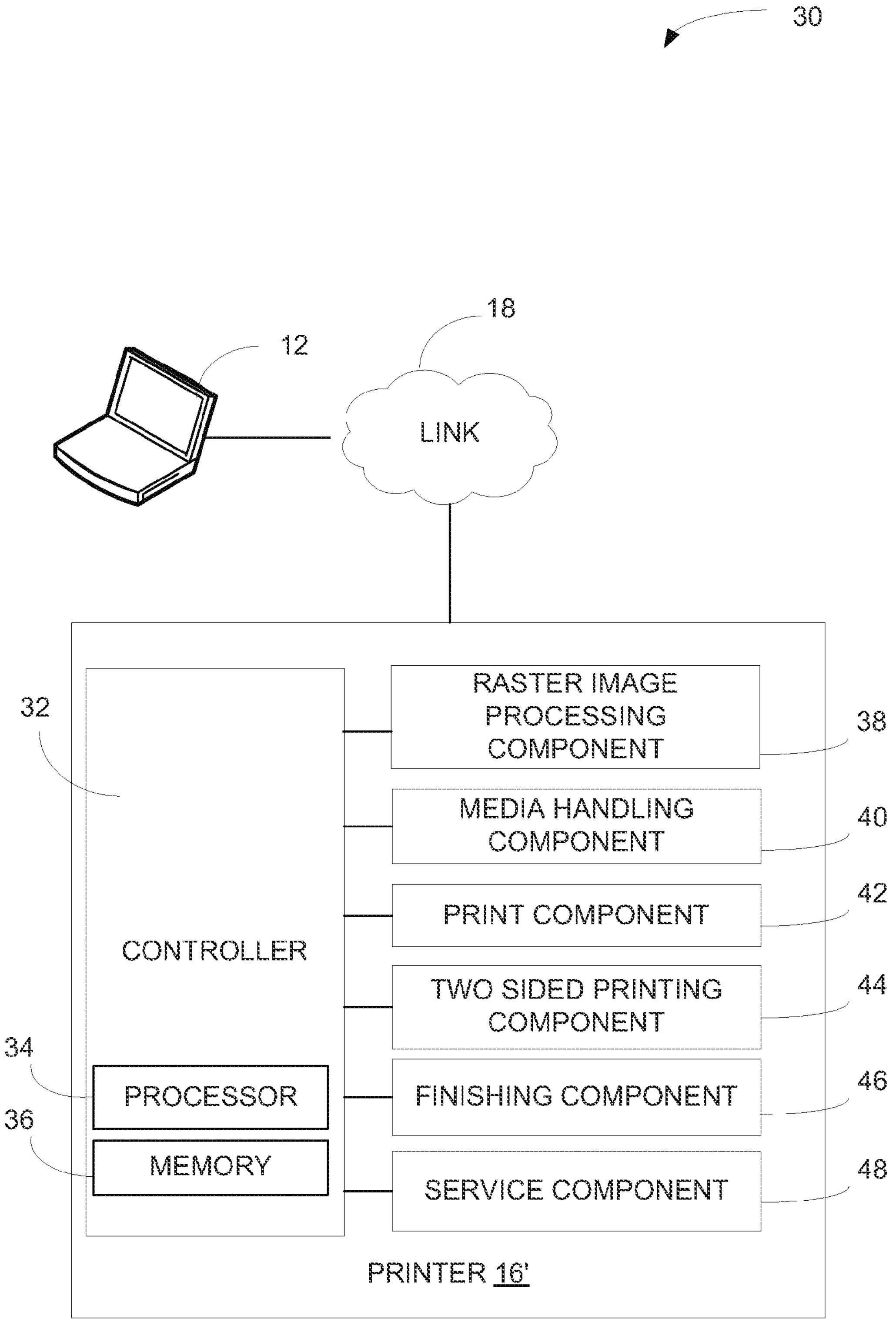
FIGS. 3-4 depict implementations of the two sided printing engine of FIG. 2 according to embodiments.

Two sided printing engine 20 may be implemented in a number of environments, such as environment 30 of FIG. 3. Environment 30 includes host computing device 12 and printer 16' interconnected via link 18. Host computing device 12 represents generally any computing device capable of sending print jobs to and communicating with printer 16', and receiving information relating to the received print jobs and the printed output from printer 16'. Printer 16' represents generally a computing device capable of receiving print jobs from host computing device 12, producing printed output from the print jobs and communicating information relating to the received print jobs and/or the printed output back to the host 12. Printer 16' is shown to include a raster image processing component 38, media handling component 40, a print component 42, a two sided printing component 44, a finishing component 46, a service component 48, and a controller 32.

Raster image processing component 38 represents generally any combination of hardware and software capable of converting digital information about fonts and graphics that describes the appearance of a plot (e.g. information from a drawing or desktop publishing application) and translating that information into an image composed of individual dots that printer 16' can output. In embodiments, a raster image processing component 38 may perform additional tasks, such as composing page layouts, scaling, calibrating printer colors, and/or managing a queue of print jobs. Media handling component 40 represents generally any combination of hardware and programming capable of transporting print media through the printer 16'. As used in this specification and the appended claims, "print media" and "media" are used synonymously. The print media may be supplied for printing via a media roll, the media roll positioned within, or adjacent, to a housing of printer 16' during printing operations. Print component 42 represents generally any combination of elements capable of being utilized to form desired images on media. In a given example, print component 42 may include a fluid ejection mechanism, each fluid ejection mechanism including multiple printheads configured to dispense ink or other fluid. As used in this specification and the appended claims, "printhead" includes a mechanism having a plurality of nozzles through which ink or other fluid is ejected. Examples of printheads are drop-on-demand inkjet printheads, thermo resistive printheads, piezo and resistive printheads. Some printheads may be part of a cartridge which also stores the fluid to be dispensed. Other printheads are standalone and are supplied with fluid by an off-axis ink supply. In other embodiments, exemplary print component 42 may include a laser printing mechanism or other type of printing mechanism. Finishing component 46 represents generally any combination of hardware and programming capable of performing a finishing operation on media. Such finishing operations include cutting, folding, laminating or any other action that affects the physical nature of the print media. Service component 48 represents generally any combination of elements capable of being utilized to service print component 42. Where, for example, print component 42 includes a printhead, service component 48 may be configured to function as a spittoon and an alignment calibrator.

Two sided printing component 44 represents generally any programming, that, when executed, implements the functionality of the two sided printing engine of FIG. 2. In particular, two sided printing component 44, when executed by controller 32, is responsible for causing printing, on a first side of a media, of a first plurality of plots and a plurality of associated fiducials. Each of the associated fiducials provides a reference for printing one of a second plurality of plots on the second side of the media. Inversion of the media may be caused after printing of the first plurality of plots to cause the second side to be in a position to be printed upon, and the associated fiducials to be exposed to a sensor as the media is advanced for second side printing. For each of a second plurality of plots, a distance is measured to one of the plurality of associated fiducials to discern or determine a reference for printing that plot on a second side of the media. The measurements are made using data from a sensor. In embodiments, the sensor may be any distance-measuring sensor, such as an optical sensor. Printing of the second plurality of plots on the second side is caused such that each of the second plurality of plots is substantially in registration with one of the first plurality of plots. In an embodiment, a signal is received when a fiducial, the fiducial printed on the first side of the media and associated with a first plot printed on the first side, is a predetermined distance from a sensor. In an embodiment, the signal indicates that the media is in an optimal position for printing of the second plot on the second side, in registration with the first plot on the first side.

As used in this specification, controller 32 represents generally any combination of elements capable of coordinating the operation of components 38, 40, 42, 44, 46 and 48. In a given implementation, controller 32 includes a processor 34 and a memory 36. The processor 34 may represent multiple processors, and the memory 36 may represent multiple memories. In an embodiment, the controller 32 may include a number of software components that are stored in a computer-readable medium, such as memory 36, and are executable by processor 34. In this respect, the term "executable" includes a program file that is in a form that can be directly (e.g. machine code) or indirectly (e.g. source code that is to be compiled) performed by the processor 34. An executable program may be stored in any portion or component of memory 36. In the foregoing discussion, various components were described as combinations of hardware and programming. Such components may be implemented in a number of fashions. In one example, the programming may be processor executable instructions stored on tangible memory media and the hardware may include a processor for executing those instructions. Thus, certain elements operating on the same device may share a common processor and common memory media.

Figure 4:
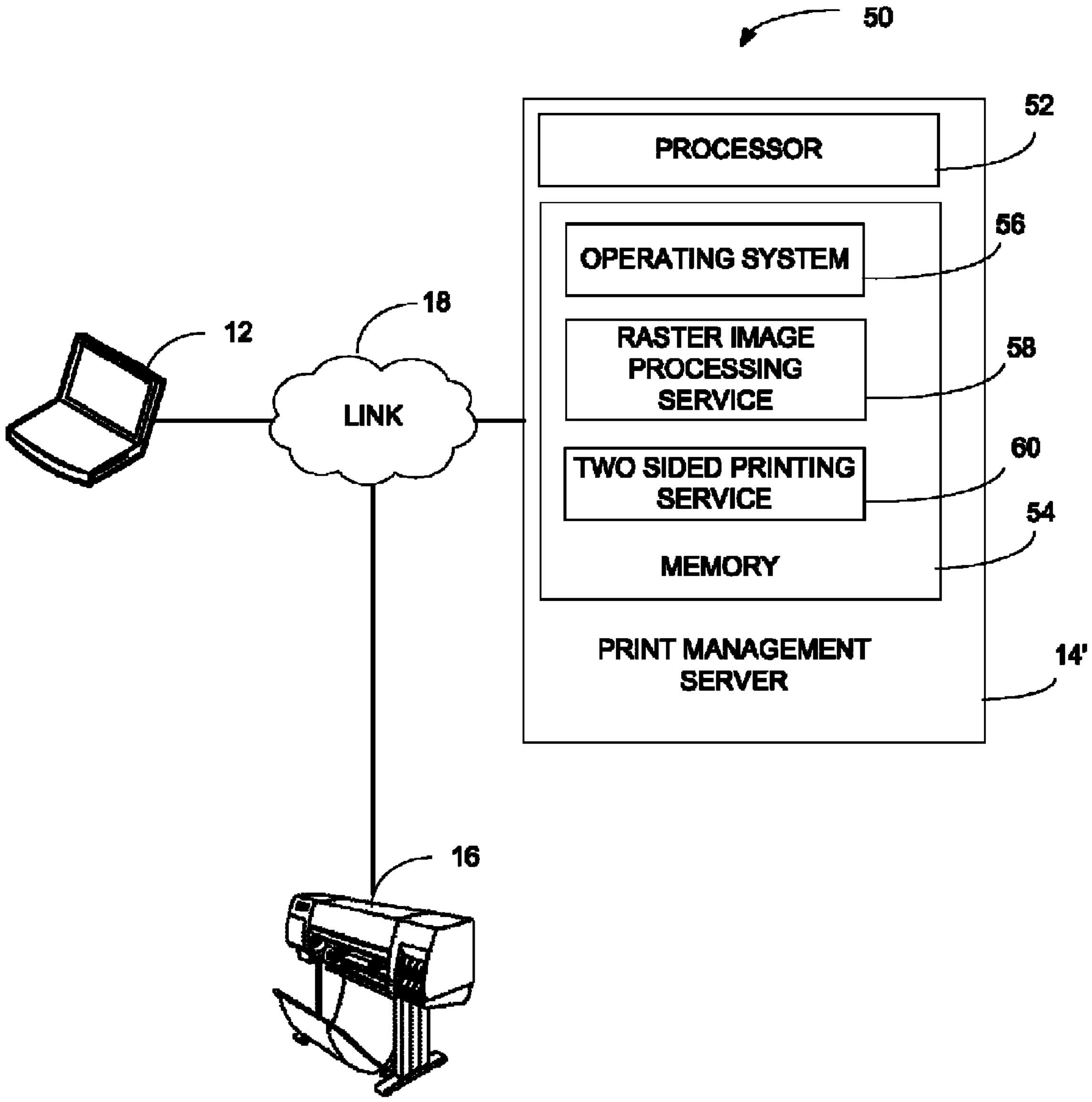

Moving to FIG. 4, an implementation is depicted in which some of the actions taken by printer 16' in FIG. 3 are now taken by print management server 14'. In particular, two sided printing service 60 residing on the print management server 14' may enable two-sided printing with improved registration of first and second side images, according to an embodiment of the disclosure. Environment 50 includes a host computer 12, a print management server 14' and a printer 16, interconnected via link 18.

Host computing device 12 represents generally any computing device capable of sending print jobs to and communicating with a print management server 14' and/or a printer 16, and receiving information relating to the received print jobs and the printed output from the print management server 14' and/or printer 16.

Printer 16 represents generally a computing device capable of receiving print jobs from host computing device 12, producing printed output from the print jobs and communicating information relating to the received print jobs and/or the printed output back to the host 12. In particular, printer 16 utilizes imaging material such as ink or toner to form a desired image on a print media, In embodiments the print media may be supplied by a media roll positioned within or adjacent to a housing of the printer 16.

In an embodiment, a print management server 14' is shown to include processor 52 and a memory 54. Processor 52 represents generally any device capable of executing program instructions stored in memory 54. Memory 54 represents generally any memory configured to store program instructions and other data. Memory 54 is shown to include an operating system 56, raster image processing service 58 and two sided printing service 60. The processor 52 may represent multiple processors, and the memory 54 may represent multiple memories. Operating system 56 represents generally any software platform on top of which other programs or applications such as the raster image processing service 58 and two sided printing service 60 run. Examples include Linux® and Microsoft Windows®. Raster image processing service 58 represents generally any combination of hardware and software capable of converting digital information about fonts and graphics that describes the appearance of a plot and translating that information into an image composed of individual dots that the printer can output. In embodiments, raster image processing service 58 may be additionally configured to compose page layouts, scale, calibrate printer colors, and/or manage a queue of print jobs.

Two sided printing service 60 in combination with operating system 56 represent generally any combination of hardware and programming that, when executed, implements the functionality of the two sided printing engine 20 of FIG. 2. In particular, two sided printing service 60, when executed by processor 52, is responsible for causing printing, on a first side of a media, of a first plurality of plots and a plurality of associated fiducials. In an embodiment, each of the plurality of associated fiducials is printed on the first side following printing of a first plot from the first plurality of plots. In an embodiment, each of the plurality of associated fiducials is a line segment printed at a known, consistent distance following the plot with which that fiducial is associated. A distance to one of the plurality of associated fiducials is measured for each of a second plurality of plots, to discern or determine a reference for printing that plot on a second side of the media. In an embodiment, the measurements are made utilizing a sensor that is contained within a printer housing. The sensor is configured to measure distances to fiducials printed on a first side of a media as the media is transported through a print zone for second side printing. Printing of the second plurality of plots is caused on the second side of the media such that each of the second plurality of plots is substantially in registration with one of the first plurality of plots. In an embodiment, the fiducials and the first and second plots may be processed for printing utilizing a raster image processing application that resides as firmware on the printer. In an embodiment, processing of the second plurality of plots for printing comprises rotating at least approximately 180 degrees, at least approximately mirroring, and reordering from last to first, the plots included within the first plurality of plots.

Figure 5:
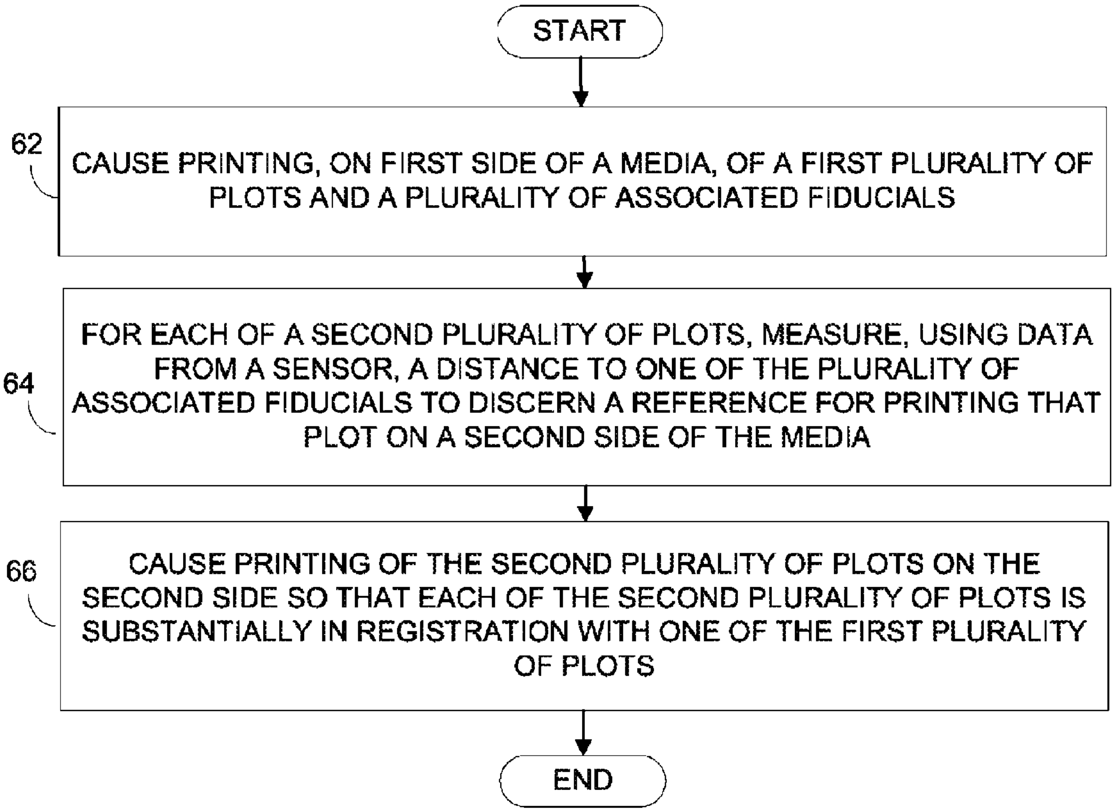
FIGS. 5-6 are flow diagrams depicting steps taken to implement various embodiments.
Figure 6:
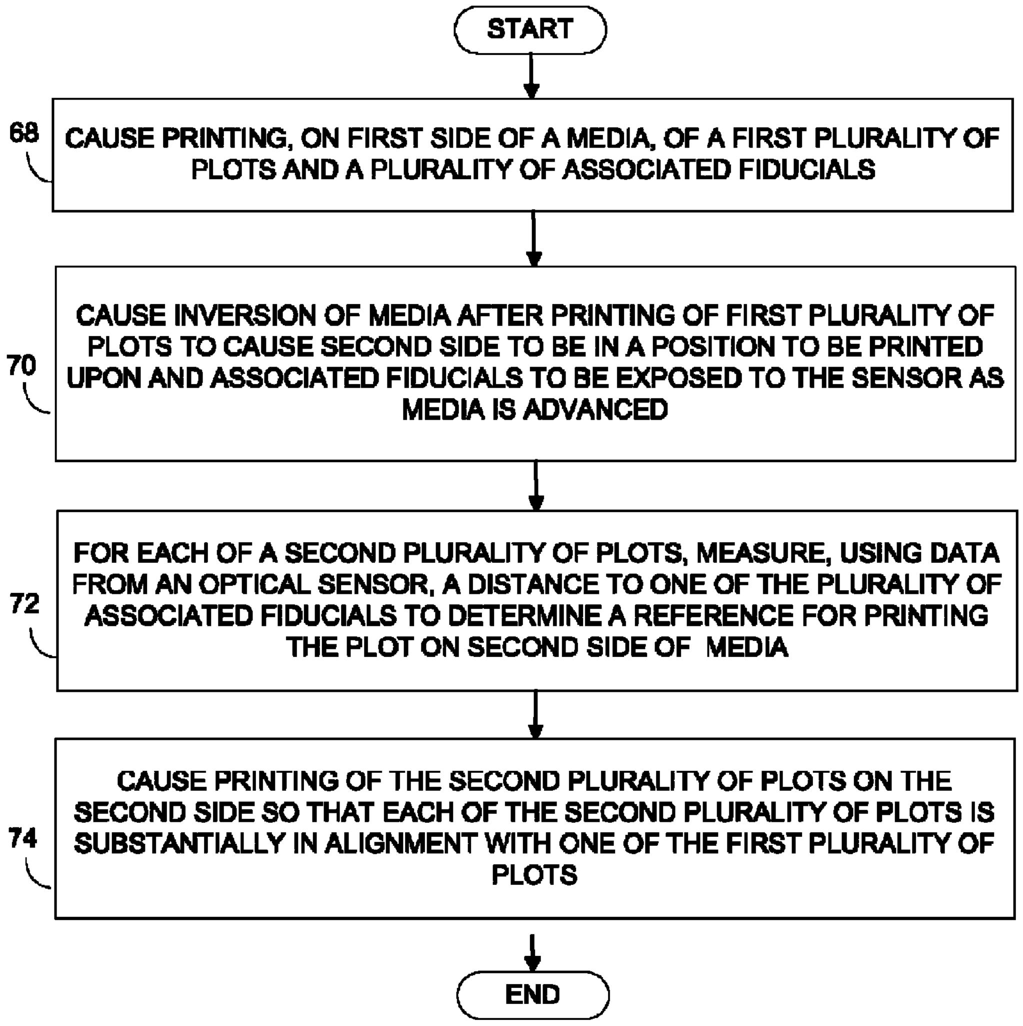

OPERATION: FIGS. 5 and 6 are example flow diagrams of steps taken to implement a method for two sided printing that improves registration of first and second side images, in accordance with an embodiment. In discussing FIGS. 5 and 6, reference may be made to the diagrams of FIGS. 1-4 to provide contextual examples. Implementation, however, is not limited to those examples.

Starting with FIG. 5, printing, on first side of a media, of a first plurality of plots and a plurality of associated fiducials is caused (block 62). Referring back to FIG. 2, the first side module 22 may be responsible for implementing block 62.

Continuing with the flow diagram of FIG. 5, for each of a second plurality of plots, a distance to one of the plurality of associated fiducials is measured to discern a reference for printing that plot on a second side of the media. The measuring is accomplished using data from a sensor (block 64). Referring back to FIG. 2, the reference module 26 may be responsible for implementing block 64.

Continuing with the flow diagram of FIG. 5, printing of the second plurality of plots is caused on the second side of the media so that each of the second plurality of plots is substantially in registration with one of the first plurality of plots (block 66). Referring back to FIG. 2, the second side module 28 may be responsible for implementing block 66. In an embodiment, a signal is received when a fiducial, the fiducial printed on the first side of the media and associated with a first plot printed on the first side, is discerned or determined to be a predetermined distance from a sensor. The signal may be a signal to begin printing of a second plot on a second side of the media, such that the first and second plots are precisely aligned or registered.

Moving on to FIG. 6, in a particular implementation, printing, on first side of a media, of a first plurality of plots and a plurality of associated fiducials is caused (block 68). In an embodiment, processing of the first plurality of plots and the plurality of associated fiducials is accomplished utilizing a raster image processor application that is installed on a computing device that is external to the printer, and the fiducials are processed at the printer. Referring back to FIG. 2, the first side module 22 may be responsible for implementing block 68.

Continuing with the flow diagram of FIG. 6, inversion of the media is caused after printing of first plurality of plots, the inversion to cause the second side to be in a position to be printed upon and the associated fiducials to be exposed to the sensor as the media is advanced (block 70). Referring back to FIG. 2, the inversion module 24 may be responsible for implementing block 70.

Continuing with the flow diagram of FIG. 6, for each of a second plurality of plots, an optical sensor is utilized to measure a distance to one of the plurality of associated fiducials to determine a reference for printing that plot on a second side of the media (block 72). Referring back to FIG. 2, the reference module 26 may be responsible for implementing block 72.

Continuing with the flow diagram of FIG. 6, printing of the second plurality of plots is caused on the second side of the media so that each of the second plurality of plots is substantially in alignment with one of the first plurality of plots (block 74). In an embodiment, processing of the second plurality of plots is accomplished utilizing the raster image processing application that is used to process the first plurality of plots and the plurality of associated fiducials. Referring back to FIG. 2, the second side module 28 may be responsible for implementing block 74.

Figure 7A:
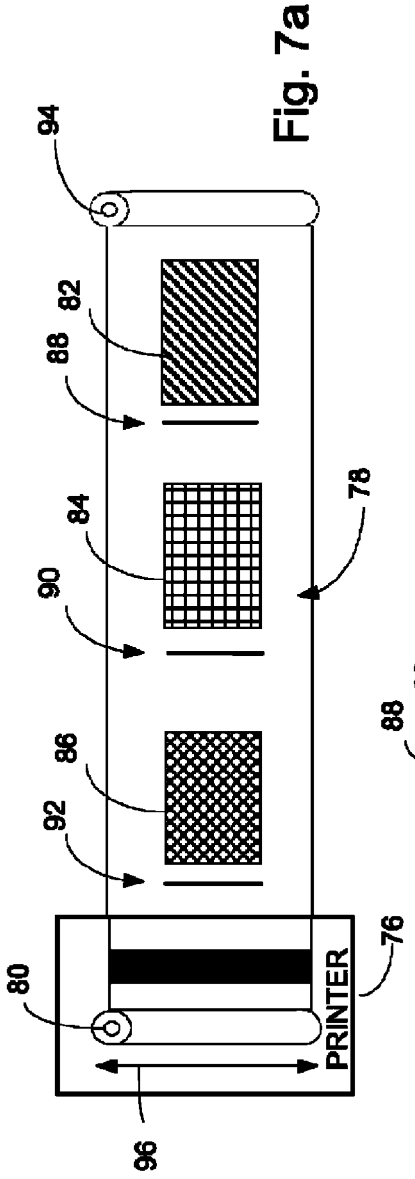
FIGS. 7*a*-7*c* depict an example implementation of the disclosed method and system for two-sided printing.
Figure 7B:
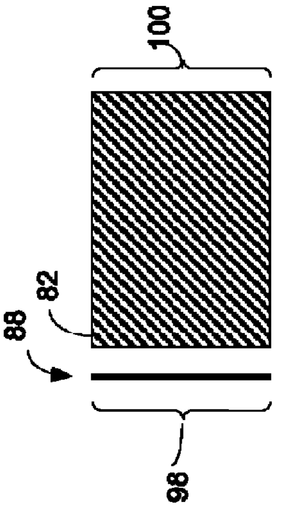
Figure 7C:
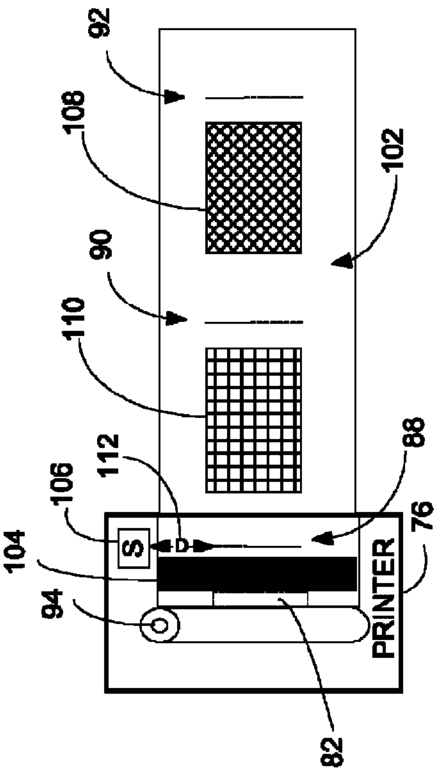

EXAMPLES: FIGS. 7*a*-7*c* depict an example implementation of the disclosed method and system for two-sided printing. FIG. 7*a* depicts a large format printer 76 configured to print plots on two sides of a print media to form a two-sided banner. Printer 76 is caused to print, on a first side 78 of a roll 80 of print media, a first plot 82, a second plot 84 and a third plot 86. The printer 76 is also caused to print a first fiducial 88 that is associated with first plot 82, a second fiducial 90 that is associated with second plot 84, and a third fiducial 92 that is associated with third plot 86. In this example, each of the first 88, second 90, and third 92 fiducials is a rectangle printed at a known, consistent distance following the plot from the fiducial is associated with. In this example, the printer 76 is caused to print the fiducials such that the long axes of the fiducials are at least approximately perpendicular to the long axis 86 of the media roll 80.

FIG. 7*b* is a close up view of the first plot 82 and the associated first fiducial 88. In this example, the first fiducial 88 is rectangular in shape, and has a first width 98 that is substantially the same as a second width 100 of the first plot 82.

FIG. 7*c* is an illustration of the printer 78 after inversion of the print media such that the first side 78 (FIG. 7*a*) is no longer visible and a second side 102 of the media is visible. In this example, inversion of the media comprised causing the media to be taken up on a take-up device 94 (FIG. 7*a*), e.g. a reel, during printing of the first 82, second 84 and third 86 plots on the first side 78 of the media, and causing repositioning of the device 94 (FIG. 7*c*) to supply and transport the media for printing of plots on the second side 102. The inversion of the media causes the second side 102 to be exposed to, and in a position to be printed upon by, a printhead element 104.

The first 88, second 90 and third 92 fiducials are illustrated in FIG. 7c as hash marks to indicate that the fiducials and first plot 82 appear on the first side of the media and are not visible in FIG. 7c. In this example, a first portion of first plot 82 is illustrated with hash marks as a second portion of first plot 82 is situated on the take-up device. An optical sensor 106 included within printer 76 is configured for use to generate data used in measuring distances to the associated fiducials. The measured distances are used to discern references for printing a fourth 108, fifth 110, and sixth plot on the second side 102 of the media in registration with the third 86, second 84 and first 82 plots, respectively. Processing of the fourth 108, fifth 110, and sixth plots for printing comprised rotating at least approximately 180 degrees, mirroring, and reordering from last to first, the first 82, second 84, and third 86 plots.

Data from sensor 106 is used in measuring a measured distance 112 from the sensor 106 to the first fiducial 88. When it is discerned or determined that the measured distance 112 is a prescribed distance from the sensor 106, printing of the sixth plot on the second side 102 begins such that the sixth plot will be printed in registration with the first plot 82 on the first side 78.

CONCLUSION: The diagram of FIG. 1 is used to depict an example environment in which various embodiments may be implemented. Implementation, however, is not so limited. FIGS. 2-4 show the architecture, functionality, and operation of various embodiments. Various components illustrated in FIGS. 2-4 are defined at least in part as programs. Each such component, portion thereof, or various combinations thereof may represent in whole or in part a module, segment, or portion of code that comprises executable instructions to implement any specified logical function(s). Each component or various combinations thereof may represent a circuit or a number of interconnected circuits to implement the specified logical function(s).

Also, the present disclosure may be embodied in any computing device-readable media for use by or in connection with an instruction execution system such as a computing device/processor based system or an ASIC (Application Specific Integrated Circuit) or other system that can fetch or obtain the logic from computing device-readable media and execute the instructions contained therein. "Computing device-readable media" can be any media that can contain, store, or maintain programs and data for use by or in connection with the instruction execution system. Computing device readable media can comprise any one of many physical media such as, for example, electronic, magnetic, optical, electromagnetic, or semiconductor media. More specific examples of suitable computing device-readable media include, but are not limited to, a portable magnetic computing device diskette such as floppy diskettes or hard drives, a random access memory (RAM), a read-only memory (ROM), an erasable programmable read-only memory, or a portable compact disc.

Although the flow diagrams of FIGS. 5 and 6 show specific orders of execution, the order of execution may differ from that which is depicted. For example, the order of execution of two or more blocks may be scrambled relative to the order shown. Also, two or more blocks shown in succession may be executed concurrently or with partial concurrence. All such variations are within the scope of the present disclosure.

The preceding description has been presented only to illustrate and describe embodiments and examples of the principles described. This description is not intended to be exhaustive or to limit these principles to any precise form disclosed. Many modifications and variations are possible in light of the above teaching.

What is claimed is:

1. A method for two sided printing, the method comprising:

causing printing, on a first side of a media, of a first plot and an associated fiducial, wherein said causing printing, on the first side of the media comprises causing printing, on the first side of the media, of a first plurality of plots including the first plot and a plurality of associated fiducials including the associated fiducial;

measuring on the first side of the media, using data from a sensor, a distance to the associated fiducial to discern a reference for printing a second plot on a second side of the media in registration with the first plot, wherein said measuring comprises measuring on the first side of the media, using data from the sensor, distances to each of the plurality of associated fiducials to discern corresponding references for printing each of a second plurality of plots including the second plot on a second side of the media in registration with corresponding ones of the first plurality of plots; and causing printing of the second plot on the second side using the reference to register the second plot with the first plot, wherein said causing printing of the second plot comprises causing printing the second plurality of plots on the second side using the corresponding references to register each of the second plurality of plots with the first plurality of plots.

2. The method of claim 1, wherein the first plot and the associated fiducial is included among the first plurality of plots and the plurality of associated fiducials and the second plot is included among the second plurality of plots.

3. The method of claim 1, wherein each of the plurality of associated fiducials has a width that is the same as a width of a corresponding one of the first plurality of plots.

4. The method of claim 1, further comprising causing inversion of the media after printing of the first plurality of plots to cause the second side to be in a position to be printed upon, and the plurality of associated fiducials to be exposed to the sensor as the media is advanced.

5. The method of claim 4, wherein causing inversion of the media comprises:

causing the media to be taken up on a take-up device during printing of the first plurality of plots; and causing positioning of the take-up device to supply the media during printing of the second plurality of plots.

6. The method of claim 5, wherein the take-up device comprises a reel.

7. The method of claim 1, further comprising processing the second plurality of plots for printing by rotating at least approximately 180 degrees, at least approximately mirroring, and reordering from last to first, the plots of the first plurality of plots.

8. The method of claim 1, wherein the first plurality of plots, the plurality of associated fiducials, and the second plurality of plots are processed for printing by a raster image processor.

9. The method of claim 1, wherein the first plurality of plots and the second plurality of plots are processed for printing by a raster image processor and the plurality of associated fiducials are processed for printing by a printer.

10. A system comprising a processor and a memory, the processor to execute instructions stored in the memory, wherein the memory stores instructions in the form of a first side module, a reference module, and a second side module:

the first side module when executed to cause printing, on a first side of a media, of a first plot and an associated fiducial, wherein said causing printing, on the first side of the media comprises causing printing, on the first side of the media, of a first plurality of plots including the first plot and a plurality of associated fiducials including the associated fiducial;

the reference module when executed to measure on the first side of the media, using data from a sensor, a distance to one the associated fiducial to discern a reference for printing a second plot on a second side of the media in registration with the first plot, wherein said measuring comprises measuring on the first side of the media, using data from the sensor, distances to each of the plurality of associated fiducials to discern corresponding references for printing each of a second plurality of plots including the second plot on a second side of the media in registration with corresponding ones of the first plurality of plots; and the second side module when executed to cause printing of the second plot on the second side using the reference to register the second plot with the first plot, wherein said causing printing of the second plot comprises causing printing the second plurality of plots on the second side using the corresponding references to register each of the second plurality of plots with the first plurality of plots.

11. The system of claim 10, wherein the first plot and the associated fiducial is included among the first plurality of plots and the plurality of associated fiducials and the second plot is included among the second plurality of plots.

12. The system of claim 11, wherein each of the plurality of associated fiducials has a width that is the same as a width of a corresponding one of the first plurality of plots.

13. The system of claim 10, further comprising an inversion module, the inversion module to cause inversion of the media after printing of the first plurality of plots to cause the second side to be in a position to be printed upon, and the plurality of associated fiducials to be exposed to the sensor as the media is advanced in the media path.

14. The system of claim 10, wherein the second side module is to process the second plurality of plots for printing by rotating at least approximately 180 degrees, at least approximately mirroring the first plurality of plots.

15. The system of claim 10, wherein the first plurality of plots and second plurality of plots are processed for printing by a raster image processor and the plurality of associated fiducials are processed for printing by a printer.

* * * * *

UNITED STATES PATENT AND TRADEMARK OFFICE

CERTIFICATE OF CORRECTION

PATENT NO. : 8,817,317 B2
APPLICATION NO. : 12/898667
DATED : August 26, 2014
INVENTOR(S) : Ezequiel Jordi Rufes et al.

It is certified that error appears in the above-identified patent and that said Letters Patent is hereby corrected as shown below:

In the Claims

In column 11, line 10, in Claim 10, delete “one”, therefor.

Signed and Sealed this
Second Day of June, 2015

Michelle K. Lee
*Director of the United States Patent and Trademark Office*